(12) United States Patent
Benni et al.

(10) Patent No.: US 8,077,312 B2
(45) Date of Patent: Dec. 13, 2011

(54) CALIBRATION DEVICE FOR A SPECTROPHOTOMETRIC SYSTEM

(75) Inventors: Paul B. Benni, Guilford, CT (US);
Andrew Kersey, Wallingford, CT (US);
Krystian Gieryk, New Haven, CT (US)

(73) Assignee: CAS Medical Systems, Inc., Branford, CT (US)

( * ) Notice: Subject to any disclaimer, the term of this patent is extended or adjusted under 35 U.S.C. 154(b) by 336 days.

(21) Appl. No.: 12/092,778

(22) PCT Filed: Nov. 3, 2006

(86) PCT No.: PCT/US2006/043100
§ 371 (c)(1),
(2), (4) Date: May 6, 2008

(87) PCT Pub. No.: WO2007/056225
PCT Pub. Date: May 18, 2007

(65) Prior Publication Data
US 2008/0285029 A1 Nov. 20, 2008

Related U.S. Application Data

(60) Provisional application No. 60/735,244, filed on Nov. 9, 2005.

(51) Int. Cl.
*G01J 3/42* (2006.01)
(52) U.S. Cl. ....................................................... 356/320
(58) Field of Classification Search ............ 356/319–320
See application file for complete search history.

(56) References Cited

U.S. PATENT DOCUMENTS

| | | | |
|---|---|---|---|
| 5,243,546 A * | 9/1993 | Maggard | 702/90 |
| 5,879,294 A | 3/1999 | Anderson et al. | |
| 6,377,840 B1 | 4/2002 | Gritsenko et al. | |
| 6,456,862 B2 | 9/2002 | Benni | |
| 6,667,803 B1 | 12/2003 | Flessland et al. | |
| 7,072,701 B2 | 7/2006 | Chen et al. | |
| 7,126,682 B2 * | 10/2006 | Rowe et al. | 356/310 |
| 2002/0197456 A1 * | 12/2002 | Pope | 428/209 |
| 2004/0236198 A1 | 11/2004 | Gritsenko | |
| 2005/0124870 A1 | 6/2005 | Lipson | |
| 2005/0277818 A1 | 12/2005 | Myers | |

* cited by examiner

*Primary Examiner* — Tarifur Chowdhury
*Assistant Examiner* — Abdullahi Nur
(74) *Attorney, Agent, or Firm* — O'Shea Getz P.C.

(57) ABSTRACT

A method and apparatus for calibrating an NIRS system which includes a sensor portion and for evaluating an NIRS system for proper functioning is provided that includes an enclosure with at least two windows disposed in a wall of the enclosure. The windows allow the light source and one or more detectors of an NIRS system sensor to interface with the enclosure. One window is dedicated to the light source while each light detector has a window dedicated thereto. Thus, the enclosure includes a number of windows equal to the number of light detectors in the NIRS system sensor plus one. The inner surface of the wall(s) of the enclosure is of a light-absorbing color; e.g., black. A diffuse reflectance member of a light-reflecting color, e.g., white, is disposed in the enclosure spaced apart from the surface with the windows disposed therein.

19 Claims, 3 Drawing Sheets

CALIBRATION DEVICE FOR A SPECTROPHOTOMETRIC SYSTEM

Applicant hereby claims priority benefits of PCT Patent Application no. PCT/US06/43100 filed Nov. 3, 2006 which claims priority to of U.S. Provisional Patent Application No. 60/735,244 filed Nov. 9, 2005, the disclosures of which is herein incorporated by reference.

This invention was made with Government support under Contract No. 2R44NS45488-01 awarded by the Department of Health and Human Services. The Government has certain rights in the invention.

BACKGROUND OF THE INVENTION

1. Technical Field

This invention relates in general to spectrophotometric systems including sensors for non-invasively determining biological tissue oxygenation utilizing near-infrared spectroscopy techniques, and in particular to a device for calibrating such systems and for evaluating the proper functioning of such systems.

2. Background Information

Near-infrared spectroscopy (NIRS) is an optical spectrophotometric method that can be used to continuously monitor tissue oxygenation levels. The NIRS method is based on the principle that light in the near-infrared range (700-1000 nm) can pass easily through skin, bone and other tissues where it encounters hemoglobin located mainly within micro-circulation passages; e.g., capillaries, arterioles, and venuoles. Hemoglobin exposed to light in the near-infrared range has specific absorption spectra that vary depending on its oxygenation state; i.e., oxyhemoglobin ($HbO_2$) and deoxyhemoglobin (Hb) each act as a distinct chromophore. By using light sources that transmit near-infrared light at specific different wavelengths, and by measuring changes in transmitted or reflected light attenuation, concentration changes of the oxyhemoglobin and deoxyhemoglobin can be monitored. The ability to continually monitor cerebral oxygenation levels, for example, is particularly valuable for those patients subject to a condition in which oxygenation levels in the brain may be compromised, leading to brain damage or death.

NIRS-type sensors typically include at least one light source and one or more light detectors for detecting reflected or transmitted light. The light signal is created and sensed in cooperation with an overall NIRS system that includes a monitor portion having a computer or processor that runs an algorithm for processing signals and the data contained therein. Typically the monitor portion is separate from the sensor portion. Thus; the sensor and monitor portions comprise the overall NIRS system. Light sources such as light emitting diodes (LEDs) or laser diodes that produce light emissions in the wavelength range of 700-1000 nm are typically used. A photodiode or other light detector is used to detect light reflected from or passed through the tissue being examined. The NIRS system processor cooperates with the light source and detector to create, detect and analyze the signals in terms of their intensity and wave properties. U.S. Pat. Nos. 6,456,862, and 7,092,701, both of which are hereby incorporated by reference in their entirety and are commonly assigned to CAS Medical Systems, Inc., of Branford, Conn., the assignee of the present patent application, disclose an NIRS system (e.g., a cerebral oximeter) and a methodology for analyzing the signals within the NIRS system.

Oftentimes an NIRS system typically includes a sensor portion having a plurality of discrete light sources located together in one location along with one or more light detectors disposed at predetermined distances from each other and from the light source. Each light source produces an infrared light signal at a particular wavelength at which a known absorption response is produced depending on the amount of oxygen concentration in the hemoglobin. Several different wavelengths are typically employed, for example, at 780 nm, 805 nm, and 850 nm. Ideally, the light sources would operate at specific wavelengths that do not vary at all from one NIRS system to another, nor would the wavelength of light output from an individual light source vary over time. However, in practice the light output from a discrete light source varies from device to device due to, e.g., manufacturability and material constraints and variables, and also over time due to operating variables such as, e.g., temperature.

What is needed, therefore, is a device that can be used to accurately and quickly calibrate an NIRS system and to evaluate the proper functionality of the NIRS system.

SUMMARY OF THE INVENTION

A device that may be used both for calibrating an NIRS system and for evaluating an NIRS system for proper functioning includes an enclosure with at least two windows disposed in a wall of the enclosure. Depending on the configuration of the enclosure, the enclosure may have more than one wall. The windows allow the light source and one or more detectors of an NIRS system sensor to interface with the enclosure. One window is dedicated to the light source while each light detector has a window dedicated thereto. Thus, the enclosure includes a number of windows equal to the number of light detectors in the NIRS system sensor plus one. In some embodiments, each window is covered by a thin, light-diffusive material. The inner surface of the wall(s) of the enclosure is of a light-absorbing color; e.g., black. A diffuse reflectance member of a light-reflecting color, e.g., white, is disposed in the enclosure spaced apart from the surface with the windows disposed therein.

In operation of the calibration device, a NIRS system sensor is positioned relative to the calibration device so that the light source aligns with the one window dedicated thereto, and the one or more light detectors each align with the corresponding one or more windows dedicated thereto. When the NIRS system is activated, light from the light source enters the enclosure. A portion of the light is absorbed by the light-absorbing walls. Another portion of the light is diffusively reflected by the reflectance member. The diffusively reflected light will reach the one or more light detectors of the NIRS system sensor and be detected. In some applications, a previously calibrated NIRS system sensor is interfaced with the calibration device and operated to generate a measurement of light that can be used as a reference value. The reference value may then be used to subsequently calibrate an uncalibrated NIRS system that is interfaced to the calibration device. If the sensor for each NIRS system is equivalent to one another, the reference value is used to calibrate the monitor portion of each of those NIRS systems, to thereby calibrate the entire NIRS system. In other instances where the sensors are not equivalent, the calibration device may be utilized to calibrate only the sensor, or calibrate the sensor and monitor portions combined.

The reflectance member reflects light in all directions (i.e., diffusive) and in a wavelength-independent manner (i.e., reflects equally over the wavelengths of interest). That is, the response of the reflectance member to the various wavelengths of light of interest is relatively flat or constant, thereby providing for relatively constant light characteristics across all wavelengths of interest. To simulate a desired attenuation of light, the surface area of the reflectance member may be made larger or smaller relative to the interior surface area of the light absorbing wall(s) of the enclosure. In other words, the interior surface of the walls acts as a spectrally constant or flat light absorber. The separation distance between the reflectance member and the windows may be changed to alter the light reflectance characteristics of the calibration device.

The calibration device is versatile in that various configurations may be utilized to accommodate different optical light source and detector arrangements. Also, the calibration device uses no solid substances or wavelength-dependent optical filters in the light pathway between the NIRS system sensor light source and detector which could undesirably absorb a relatively large proportion of the light and tend to degrade the desired characteristics of the calibration device.

The calibration device may be configured for use with NIRS systems that utilize sensors having one or more light detectors. For those sensors that include more than one detector, the calibration device can accommodate light detectors disposed at equal or unequal distances from the light source. NIRS system sensors used in cerebral applications, for example, typically have light detectors placed at different distances from the light source; e.g., a "far" detector and a "near" detector. The level of light received by the "far" detector is typically much lower in magnitude as compared to the magnitude of light received by the "near" detector because of the amount of tissue traversed. The calibration device simulates the differences in light magnitude by sizing the reflectance member and positioning the same relative to the windows for the light source and the detectors. For example, positioning the reflectance member further away from the far detector window than the near detector window causes the far detector to receive a magnitude of light lower than that received by the near detector.

One of the advantages of the calibration device is that it can be made in an inexpensive disposable form. The calibration device may be fabricated from relatively inexpensive materials that allow it to be used once and discarded. A disposable calibration device provides a distinct advantage, since it can be used with NIRS systems that are typically employed in a healthcare environment where a relatively high degree of cleanliness is desired.

These and other features and advantages of the present invention will become apparent in light of the drawings and detailed description of the present invention provided below.

DETAILED DESCRIPTION OF THE INVENTION

Figure 3:
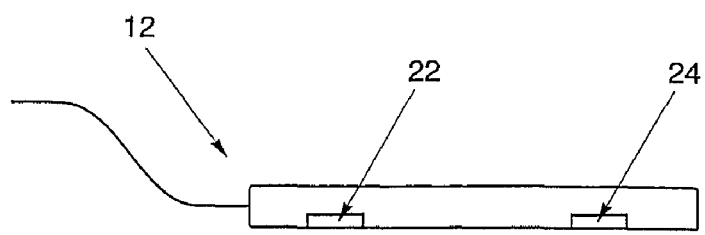
FIG. 3 is a diagrammatic side view of a spectrophotometric sensor for use with the device of FIGS. 1 and 2.
Figure 2:
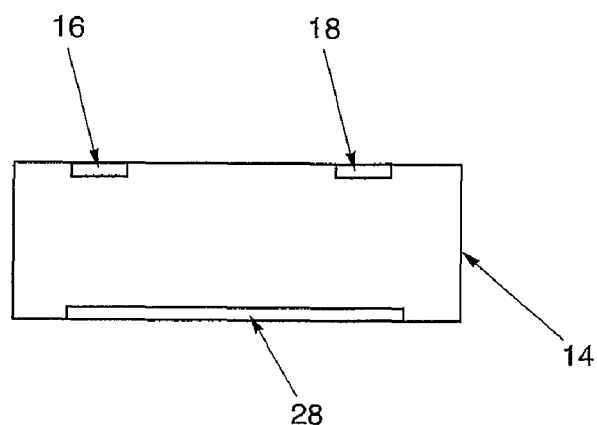
FIG. 2 is a diagrammatic side view of the device of FIG. 1.
Figure 1:
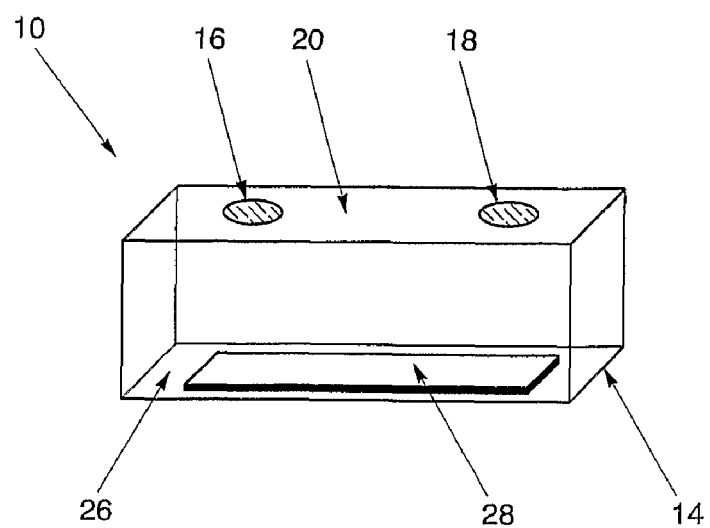
FIG. 1 is a diagrammatic perspective view of a device for calibrating a spectrophotometric system.

Referring to FIGS. 1-3, a device 10 for calibrating an NIRS spectrophotometric system (e.g., a cerebral oximeter), which includes a sensor portion 12, has an enclosure 14. In FIGS. 1-2, the enclosure 14 is a rectangular-shaped box having a plurality of walls. However, the enclosure 14 is not limited to a box. Instead, the enclosure 14 may take on other shapes or forms, depending, for example, on the configuration of the sensor 12. An example of an NIRS spectrophotometric system is described and illustrated in the aforementioned U.S. Pat. No. 6,456,862, which is hereby incorporated by reference in its entirety. The present calibration device is not, however, limited to use with the device disclosed within U.S. Pat. No. 6,456,862. The walls of the box 14 have their inside surfaces of a color (e.g., black) for the purpose of absorbing light. The walls of the box 14 may comprise a plastic, cardboard or other type of suitable material. Two windows 16, 18 are disposed in the top wall 20 of the box 14. The windows 16, 18 may be covered by a thin, light-diffusive material that allows for diffusion of light into the box 14 while sealing the box from contaminants. The windows 16, 18 are positioned to align with a light source 22 and a light detector 24, respectively, of the sensor 12.

A diffuse reflectance member 28 that is of a color (e.g., white) that reflects light is disposed inside the box 14. The member 28 may be made from roughened plastic, glass filled PTFE, ceramic or tile, paper, cardboard, flat/matte paint, or relatively higher optical grade plastics such as Spectralon from Labsphere, Inc. of North Sutton, N.H. In general, any material of a color that reflects light in a diffusive manner (i.e., in all directions) and that has a roughened surface instead of a relatively shiny surface can be used as the reflectance member 28. The member 28 may be positioned anywhere within the enclosure 14 to achieve the desired reflectance of light. In the embodiments illustrated in FIGS. 1-3, the member 28 is attached to a surface of the wall 26 that is opposite the top wall 20. In alternative embodiments, the member 28 can be positioned anywhere within the enclosure 14 where the desired amount of light reflectance can be achieved. In addition, the member 28 can be mounted within the box 14 in a variety of different ways, rather than being disposed on a surface of a wall 26 (e.g., mounted on a pedestal attached to a wall).

The portion of the light emanating from the light source 22 of the sensor 12 and coming through the light source window 16 which encounters the member 28 is reflectively scattered throughout the inside of the box 14. The remainder of the light from the light source 22 that enters the box 14 is absorbed by the inner walls of the box 14. A portion of the input light that is reflected by the member 28 is reflected back through the light detector window 18 to the light detector 24 of the sensor 12. The amount of surface area of the reflectance member 28, the positioning of the reflectance member 28 relative to the windows 16, 18, the amount of surface area on the inside panels of the box 14, and the dimensions of the box 14, collectively determine the amount of light received by the light detector 24 from the light source 22, and the amount of light that is absorbed within the box 14. The calibration device 10 can therefore be configured to simulate the amount of light attenuation that a spectrophotometric sensor 12 would normally encounter during examination of biological tissue or other medium when the sensor is place in contact therewith, in a wavelength independent manner throughout the wavelengths of interest.

Figure 6:
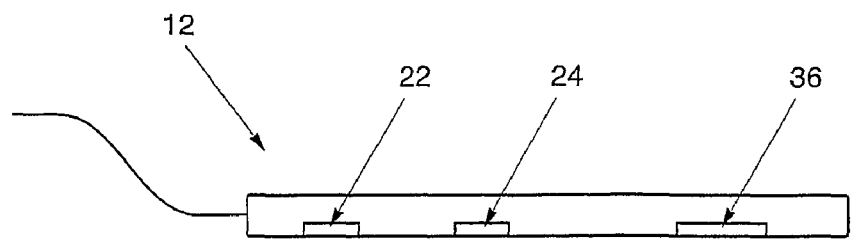
FIG. 6 is a diagrammatic side view of a spectrophotometric sensor for use with the device of FIGS. 4 and 5.
Figure 5:
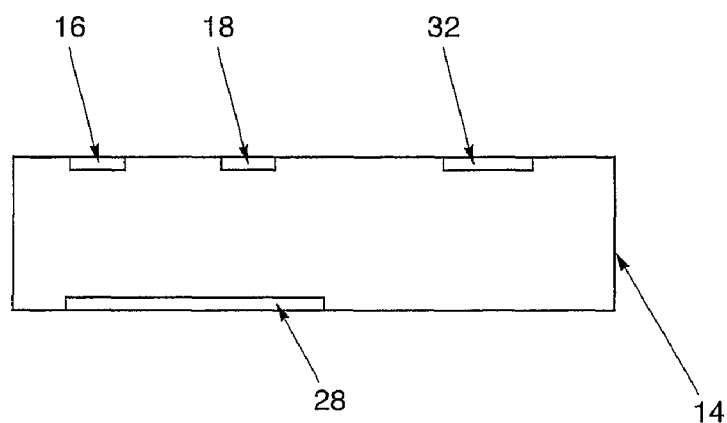
FIG. 5 is a diagrammatic side view of the device of FIG. 4.
Figure 4:
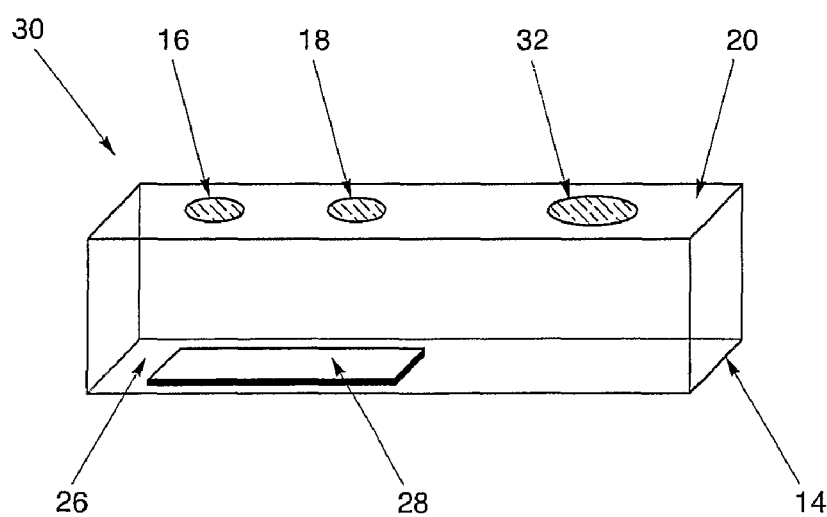
FIG. 4 is a diagrammatic perspective view of another embodiment of a device for calibrating a spectrophotometric system.

FIGS. 4-6 illustrate an embodiment of a device 30 for calibrating an NIRS spectrophotometric system that is similar to the calibration device 10 illustrated in FIGS. 1-2 and described above. In the embodiment shown in FIGS. 4-6, three windows 16, 18, 32 are disposed in the top wall 20 of the box 14. One window 16 is aligned with the light source 22 of a sensor 34, while the other two windows 18, 32 are aligned with the two separate light detectors 24, 36 of the sensor 34 (i.e., a "neat" light detector 24 and a "far" light detector 36). An example of an NIRS system, including such a sensor, is described and illustrated in the aforementioned U.S. Pat. No. 7,092,701, which is hereby incorporated by reference in its entirety. The reflectance member 28 is sized and be positioned relative to the windows 16, 18 so that the near light detector 24 and the far light detector 36 receive different magnitudes of light emanating from the light source 22. That is, the far light detector 36 receives a relatively smaller amount of light as compared to the amount of light received by the near light detector 24. This is done to simulate typical light measurement conditions in biological tissue encountered by the cerebral oximeter in actual use on a human subject.

Operation of the calibration devices 10, 30 of FIGS. 1-2 and 4-5 for calibrating a spectrophotometric system may occur as follows. First, a spectrophotometric system that includes a sensor, such as the cerebral oximeter of the aforementioned U.S. Pat. Nos. 6,456,862, or 7,092,701, is calibrated apart from and without use of the respective calibration device 10, 30. That is, the spectrophotometric system may be calibrated, for example and without limitation, through use of empirical data collected from a subject under study, as described in more detail in the aforementioned U.S. Pat. No. 6,456,862. As discussed in that patent, the calibrating of a spectrophotometric system such as the cerebral oximeter disclosed therein provides a relatively accurate indication of the total oxygen saturation level in human tissue by removing extraneous information relating to certain types of undesirable light attenuation from the determination. Once that particular spectrophotometric system is calibrated, the sensor 12, 34 of that calibrated system is interfaced with the box 14. Using predetermined fixed wavelengths of infrared light, for example, 780 nm, 805 nm, and 850 nm, to determine fixed absorption coefficients that are characteristic of the particular type of spectrophotometric system (each wavelength, for example, having a ±5 nm tolerance), with the infrared light emanating from the light source 22 of the sensor 12, 34, a measurement is made of the amount of light that is received by each of the one or more light detectors 24, 36 of the sensor, 12, 34. This measurement of light corresponds to a reference value. Since the calibration device 10, 30 has the desired spectrally constant or flat light absorption characteristic, individual wavelength tolerances do not alter the amount of the measured value of light received by the detectors 24, 36. When a second, uncalibrated similar type of spectrophotometric system has its sensor portion interfaced to the calibration device 10, 30, the internal calibration parameters of this uncalibrated spectrophotometric system may be adjusted until the calculated amount of measured light received by the light detectors 24, 36 agrees with the reference value measured earlier in conjunction with the first calibrated spectrophotometric system. As described in detail in the aforementioned U.S. Pat. No. 6,456,862, the internal calibration parameters account for the effects of undesirable light attenuation due to various sources, such as scattering within tissue, thereby allowing for a more accurate determination of total oxygen saturation. Once calibrated in this manner, the second spectrophotometric system can be used with its own particular wavelengths to measure absolute cerebral blood oxygenation. Thus, once the first or reference spectrophotometric system is calibrated, other similar spectrophotometric systems can be calibrated with the need for any type of human invasive procedure.

Figure 8:
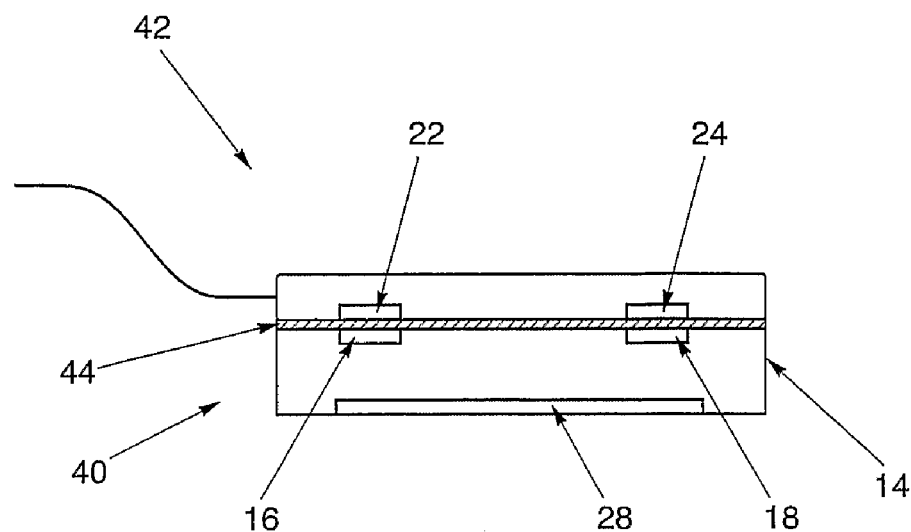
FIG. 8 is a diagrammatic side view of the device of FIG. 7 together with the disposable spectrophotometric sensor attached thereto.
Figure 7:
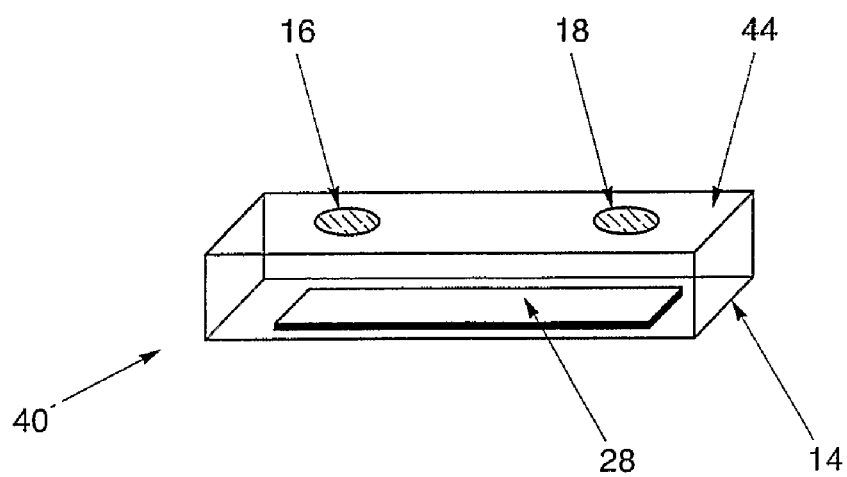
FIG. 7 is a diagrammatic perspective view of a device for calibrating and evaluating the functionality of a disposable spectrophotometric sensor.

Referring to FIGS. 7-8, there illustrated is a device 40 for both calibrating and evaluating a spectrophotometric system, for example, having a disposable spectrophotometric sensor 42. The device 40 itself may be disposable and as such is suitable for one time use. To facilitate the disposability and one time usage of the device 40 and the sensor 42, the disposable device 40 may be packaged together with the sensor 42, where an adhesive release liner 44 is disposed between the device 40 and the sensor 42. The disposable device 40 may be similar to the calibration devices 10, 30 described hereinabove and illustrated in FIGS. 1-2 and 4-5. The disposable device 40 may have its box 14 constructed of relatively inexpensive materials such as cardboard paper, plastic, or other suitable material, with inner walls of a color, e.g., black, that absorbs light. The windows 16, 18 in the box 14 may be covered by a thin diffusive tape or membrane. When an unused sensor 42 is connected to the disposable device 40, the device 40 can evaluate the proper functioning of the sensor 42 and corresponding system before the sensor 42 is attached to the subject being monitored. Once the functionality of the sensor 42 is determined to be acceptable, the disposable device 40 and the sensor 42 may be separated by removing the sensor 42 from the adhesive release liner 44, thereby exposing adhesive on a patient-contacting side of the sensor 42 for attachment to the skin of the subject to be tested.

With the unused sensor 42 still attached to the device 40, the sensor 42 can be calibrated and its functionality evaluated relatively easy and quickly. Regarding calibration, similar to the procedure described above with respect to the device 10, 30 of FIGS. 1-2 and 4-5, if the actual or measured calibration values agree with the expected calibration values, then the sensor 42 may be determined to be functioning properly and is ready to be attached to the subject after the disposable device 40 is removed. If this procedure is used, some portion or all sensors 42 of a given type may have individual calibration information and do not need to be individually calibrated to any one particular sensor 42. Regarding the evaluation of proper functionality, a determination may be made as to whether the amount of light received by the light detector 24 of the sensor 42 is within an acceptable predetermined range. If the received light is within range, then the sensor 42 may be determined to be functioning properly and is ready for use on a subject. If an out of range reading (e.g., a low light level) is measured, then the connection of the sensor 42 to the device 40 monitor may need to be cleaned, or the sensor 42 may not be properly interfaced to the device 40, or possibly some other problem with the cerebral oximeter exists, for example, the sensor light source optical fiber may be fractured. If no light is detected, then the sensor 42 may have a broken electrical lead, a broken optical fiber, some type of misconnection, or possibly the cerebral oximeter itself has a problem.

The enclosure has been described and illustrated herein as being a box 14 having a generally rectangular shape. However, the enclosure is not limited as such. The enclosure may take on any shape, with planar walls and with non-planar (e.g., curved) walls. It suffices that the enclosure be of a shape such that at least two windows can be formed in the enclosure to allow light to enter the enclosure through one window and exit the enclosure through the other window, and that a reflectance member be placed within the enclosure such that light from the source is reflected off the member and back to the light detector in a desired amount, and further that the inner wall surfaces of the enclosure be of a color that absorbs light in a desired amount.

Although the present invention has been illustrated and described with respect to several preferred embodiments thereof, various changes, omissions and additions to the form and detail thereof, may be made therein, without departing from the spirit and scope of the invention.

What is claimed is:

1. A device for calibrating a spectrophotometric system having a sensor portion with a light source and at least one light detector, comprising:
an enclosure that includes:
at least two windows formed in the enclosure, the two windows having a predetermined spacing from one another;
each inside surface of the enclosure being of a color that absorbs a predetermined amount of light entering the enclosure through a first one of the windows and emanating from the light source; and
a diffuse reflectance member disposed inside the enclosure in a predetermined location therewithin to reflect a predetermined amount of the light entering the enclosure from the light source through the first one of the windows to the second one of the windows to the at least one light detector, an amount of the light reflected by the member to the second window being attenuated in magnitude as compared to an amount of light entering the enclosure through the first window, the diffuse reflectance member being of a color that reflects light.

2. The calibration device of claim 1, where each of the at least two windows is covered by a light-diffusive layer.

3. The calibration device of claim 1, where the enclosure further includes a third window formed therein.

4. The calibration device of claim 1, where the color of each inside surface of the enclosure is black.

5. The calibration device of claim 1, where the color of the diffuse reflectance member is white.

6. The calibration device of claim 1, where the enclosure comprises a box.

7. The calibration device of claim 6, where the at least two windows are located in a surface of the box, and where the diffuse reflectance member is disposed on an inside surface of the box that is opposite the surface in which the at least two windows are located.

8. The calibration device of claim 1, where the diffuse reflectance member has a surface that reflects light.

9. The calibration device of claim 8, where the reflecting surface of the member comprises a roughened material.

10. The calibration device of claim 8, where an amount of surface area of the reflecting surface of the member determines at least in part the amount of the light from the light source that is reflected by the member to the second one of the windows.

11. The calibration device of claim 1, where an amount of surface area of each inside surface of the enclosure determines at least in part an amount of the light from the light source that is absorbed by each inside surface of the enclosure and that is reflected by the member to the second one of the windows.

12. The calibration device of claim 1, where the dimensions of the enclosure determine at least in part the amount of light from the light source that is reflected by the member to the second one of the windows.

13. A method for calibrating a spectrophotometric system having a sensor with a light source and at least one light detector, comprising the steps of:
calibrating a first spectrophotometric system;
providing a device for calibrating a spectrophotometric system, the calibrating device having an enclosure with an inside surface of a color that absorbs light, at least two windows formed in the enclosure, and a diffuse reflectance member disposed inside the enclosure;
interfacing the first spectrophotometric system with the calibrating device;
sending light from the light source of the first spectrophotometric system sensor through the first window into the enclosure where it is absorbed in part by the inside surface and is reflected in part by the diffuse reflectance member to the second window and to the at least one light detector, an amount of light present at the at least one light detector being attenuated as compared to an amount of light entering the enclosure from the light source;
interfacing an uncalibrated spectrophotometric system with the calibrating device;
sending light from the light source of the uncalibrated system through the first window into the enclosure where it is absorbed in part by the inside surface and is reflected in part by the diffuse reflectance member to the second window to the at least one light detector; and
calibrating the uncalibrated system by adjusting at least one predetermined internal parameter of the uncalibrated system until an amount of light present at the at least one light detector equals the calculated attenuated amount of light from the step of sending light performed with the first spectrophotometric system sensor interfaced with the calibrating device.

14. The calibration method of claim 13, where the step of calibrating a first spectrophotometric system utilizes empirical data from a subject under study.

15. The calibration method of claim 13, where the step of interfacing the first spectrophotometric system comprise the step of aligning the light source with a first one of the at least two windows so that light from the light source passes into the enclosure, and aligning the at least one light detector with a second one of the at least two windows so that light from inside the enclosure passes to the at least one light detector.

16. The calibration method of claim 13, further comprising the step of locating the diffuse reflectance member inside the enclosure so that a predetermined amount of the light from the light source is reflected by the member to the second one of the at least two windows.

17. A disposable device for calibrating and evaluating a spectrophotometric system having a disposable sensor portion with a light source and at least one light detector, the disposable device comprising:
an enclosure that includes:
at least two windows formed in the enclosure, the two windows having a predetermined spacing from one another;
each inside surface of the enclosure being of a color that absorbs a predetermined amount of light entering the enclosure through a first one of the windows and emanating from the light source; and
a diffuse reflectance member disposed inside the enclosure in a predetermined location therewithin to reflect a predetermined amount of the light entering the enclosure from the light source through the first one of the windows to the second one of the windows to the at least one light detector, an amount of the light reflected by the member to the second window being attenuated in magnitude as compared to an amount of light entering the enclosure through the first window, the diffuse reflectance member being of a color that reflects light; and
an adhesive liner disposed between the sensor portion of the spectrophotometric system and the disposable device.

18. A method for calibrating a spectrophotometric system and for evaluating the operation of the spectrophotometric system, the spectrophotometric system having a disposable sensor with a light source and at least one light detector, the method comprising the steps of:

calibrating a first spectrophotometric system;

providing a disposable device for calibrating a spectrophotometric system, the disposable calibrating device having an enclosure with an inside surface of a color that absorbs light, at least two windows formed in the enclosure, and a diffuse reflectance member disposed inside the enclosure;

interfacing the disposable sensor portion of a first spectrophotometric system with the disposable calibrating device;

sending light from the light source of the first spectrophotometric system sensor through the first window into the enclosure where it is absorbed in part by the inside surface and is reflected in part by the diffuse reflectance member to the second window and to the at least one light detector, an amount of light present at the at least one light detector being attenuated as compared to an amount of light entering the enclosure from the light source;

interfacing the disposable sensor portion of an uncalibrated spectrophotometric system with the disposable calibrating device;

sending light from the light source of the uncalibrated system through the first window into the enclosure where it is absorbed in part by the inside surface and is reflected in part by the diffuse reflectance member to the second window to the at least one light detector; and calibrating the uncalibrated system by adjusting at least one predetermined internal parameter of the uncalibrated system until an amount of light present at the at least one light detector equals the calculated attenuated amount of light from the step of sending light performed with the first spectrophotometric system sensor interfaced with the calibrating device.

19. The method of claim 18, further comprising the step of evaluating the operation of the spectrophotometric system by comparing the amount of light present at the at least one light detector with a predetermined value and determining whether the result of the step of comparing is within an acceptable range.

* * * * *